US006689513B1

(12) United States Patent
Morigaki et al.

(10) Patent No.: US 6,689,513 B1
(45) Date of Patent: Feb. 10, 2004

(54) LITHIUM SECONDARY BATTERY

(75) Inventors: Kenichi Morigaki, Hyogo (JP); Masaya Okochi, Osaka (JP); Shinji Mino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/622,721

(22) PCT Filed: Dec. 9, 1999

(86) PCT No.: PCT/JP99/06895

§ 371 (c)(1),
(2), (4) Date: Mar. 5, 2001

(87) PCT Pub. No.: WO00/39878

PCT Pub. Date: Jul. 6, 2000

(30) Foreign Application Priority Data

Dec. 25, 1998 (JP) ............................................. 10-369183

(51) Int. Cl.[7] ........................... H01M 10/40; H01M 6/16
(52) U.S. Cl. ................... 429/231.95; 429/307; 429/332
(58) Field of Search .................. 429/307, 326, 429/330, 332, 231.95

(56) References Cited

U.S. PATENT DOCUMENTS

| 4,132,837 | A | | 1/1979 | Soffer |
| 4,520,083 | A | | 5/1985 | Prater et al. |
| 5,130,211 | A | | 7/1992 | Wilkinson et al. |
| 5,521,027 | A | * | 5/1996 | Okuno et al. ................ 429/332 |
| 5,529,859 | A | | 6/1996 | Shu et al. |
| 6,030,720 | A | * | 2/2000 | Chu et al. .................... 429/105 |
| 6,420,070 | B1 | * | 7/2002 | Kasamatsu et al. ....... 429/231.8 |

FOREIGN PATENT DOCUMENTS

| JP | 53-76322 | | 7/1978 |
| JP | 57-141878 | | 9/1982 |
| JP | 58-12992 | | 3/1983 |
| JP | 61-8849 | | 1/1986 |
| JP | 6-13110 | | 1/1994 |
| JP | 06168739 | | 6/1994 |
| JP | 8-7922 | | 1/1996 |
| JP | 08-106920 A | * | 4/1996 |
| JP | 09-223517 A | * | 8/1997 |
| JP | 9-223517 | | 8/1997 |

OTHER PUBLICATIONS

JPO Machine Translation for JP–08–106920–A (Apr. 1996).*
International Search Report corresponding to application No. PCT/JP99/06895 dated Mar. 21, 2000.
English translation of Form PCT/ISA/210, for PCT/JP99/06895 dated Mar. 21, 2000.

* cited by examiner

Primary Examiner—Susy Tsang-Foster
(74) Attorney, Agent, or Firm—RatnerPrestia (57) ABSTRACT

A lithium secondary battery is disclosed. The battery comprises a positive electrode, a negative electrode, an electrolyte solution comprising an electrolyte, a separator, and a ligand. The ligand is oriented at the interface of the electrolyte solution and the positive electrode and at the interface of the electrolyte solution and the negative electrode. The ligand has a cyclic structure having a pore that has a diameter of about 1.7 angstroms or more and coordinates lithium ions more strongly than either the solvent or the electrolyte. Typical ligands are coronands (crown ethers), podanocoronands (lariat ethers), cryptands, and spherands. The battery maintains high reliability and energy density, even after storage at high temperature.

16 Claims, 3 Drawing Sheets

LITHIUM SECONDARY BATTERY

This application is a U.S. National Phase Application of PCT International Application PCT/JP99/06895, filed Dec. 9, 1999.

TECHNICAL FIELD

The present invention relates to a lithium secondary battery comprising a positive electrode having a lithium-containing composite oxide as active material, a negative electrode having graphite capable of reacting to insert or extract lithium as active material, a separator, and an organic electrolyte solution.

BACKGROUND ART

A lithium ion secondary battery comprising an organic electrolyte solution, a negative electrode active material of carbon material, and a positive electrode active material of lithium-containing composite oxide has a higher voltage, a higher energy density, and an excellent low temperature characteristic as compared with a secondary battery of aqueous solution. In such secondary battery, since lithium metal is not used as negative electrode, an excellent cycle stability and a high safety are known, and it is put in practical use. Further, a lithium secondary battery mixing a polymer absorbing and holding an organic electrolyte solution in the active material layer and using a separator made of such polymer is being developed as thin and lightweight type.

Various additives have been proposed so far for improving the characteristics of the lithium secondary battery. In particular, it is known that 12-crown-4-ether as crown ether (coronand) and lithium ion strongly form a complex of 1:1, and it has been proposed to use the crown ether as an additive for suppressing lithium dendrite (for example, Japanese Patent Publication No. 58-12992, Japanese Laid-open Patent No. 57-141878, Japanese Laid-open Patent No. 61-8849, Japanese Patent No. 2771406, U.S. Pat. Nos. 4,132,837, and 4,520,083). As a stabilizing agent in LiAs/$F_6$/THF system, 18-crown-6-ether has been proposed (Proc. 34th Int. Power Sources Symp., 84, IEEE, Piscataway, N.J.).

Also in the Li/$TiS_2$ battery system utilizing intercalation reaction, the additive effect of 12-crown-4-ether has been reported (J. Electrochem. Soc., 134-(1987), 2107). Further, Japanese Laid-open Patent No. 6-13110 proposes to use crown ether as cosolvent or additive in the battery system utilizing the intercalation reaction to the negative electrode using graphite, and 12-crown-4-ether is disclosed as an optimum crown ether for lithium cation. The content of such 12-crown-4-ether in molar number is required to be a molar number equal to superior to that of electrolyte salt, or preferably a double molar number of electrolyte salt.

Besides, as an additive for promoting intercalation reaction into graphite in the PC system electrolyte solution, 12-crown-4-ether has been proposed (J. Electrochem. Soc., 140 (1993), 922; J. Electrochem. Soc., 140 (1993), L101; J. Electrochem. Soc., 141 (1994), 603). Further, in the polymer battery system, similar proposals have been made (Japanese Laid-open Patent No. 61-284071, Japanese Laid-open Patent No. 3-220237, U.S. Pat. Nos. 4,609,600, and 5,523,179, etc.).

As clear from these proposals, the state of solvation varies significantly depending on the complex forming capacity and complex forming of crown ether in the organic electrolyte solution system on lithium ions. However, depending on the type of the crown ether, the complex may be too strong, or the effect of complex formation varies depending on the type of the electrolyte solution solvent, and it is not put in practical use yet.

A lithium ion secondary battery of organic electrolyte solution system comprising a positive electrode active material having a lithium-containing composite oxide, a negative electrode active material having a graphite material capable of reacting to insert or extract lithium has problems such as drop of capacity in high temperature storage. For example, when a conventional lithium ion secondary battery is stored for 10 days at 70° C., the battery capacity deteriorates to about 70%.

It is hence an object of the invention to present a lithium secondary battery of high energy density or a lithium polymer secondary battery having such characteristics as small capacity drop in high temperature storage, favorable cycle characteristic and excellent reliability.

SUMMARY OF THE INVENTION

A lithium secondary battery of the invention comprises a positive electrode having an oxide containing lithium as a positive electrode active material, a negative electrode having a negative electrode active material capable of reacting chemically with the lithium, an electrolyte solution, a separator, and a ligand.

The electrolyte solution contains a solvent, and an electrolyte dissolved in the solvent, and the solvent has about 20 donor number or less.

The ligand is oriented at the interface of the electrolyte solution and positive electrode surface, and at the interface of the electrolyte solution and negative electrode surface, the ligand has a stronger coordination selecting capacity than the solvent or electrolyte against the lithium, and the ligand has a cyclic structure having a pore in the chemical formula, and this pore has a diameter of about 1.7 angstroms or more.

The ligand is contained in the electrolyte solution, and the ligand is contained in a range of $10^{-1}$ to $10^{-4}$ by molar ratio to the electrolyte.

Or, the ligand is contained in the electrolyte solution, and the ligand is contained in a range of 1 micromole to 1 millimole per 1 Ah of the battery capacity.

Preferably, the solvent contains one mixed solvent of (a) cyclic carbonate and chain carbonate, or (b) cyclic carbonate, chain carbonate, and aliphatic carboxylic acid ester, and the amount of the mixed solvent contains more than 80% of the total volume of the solvent.

Preferably, the electrolyte contains at least one selected from the group consisting of lithium perchlorate, lithium tetrafluoro borate, lithium hexafluoro phosphate, trifluoromethane sulfonate, and trifluoromethane imide sulfonate.

Preferably, the ligand is at least one selected from the group consisting of coronand, podanocoronand, cryptand, and spherand.

Preferably, the oxide containing lithium has lithium cobalt oxide, and the negative electrode active material has graphite.

In this composition, deterioration of battery characteristic after the secondary battery is stored in high temperature atmosphere is remarkably improved, and even after storage in high temperature atmosphere, a high reliability and a high energy density are maintained.

BEST MODE FOR CARRYING OUT THE INVENTION

In a lithium ion secondary battery of organic electrolyte solution system comprising a positive electrode active material having lithium-containing composite oxide, and a negative electrode active material having a graphite material capable of reacting to insert or extract lithium, a method of controlling the solvent structure on the electrode interface is studied. Controlling the complex forming capacity of ligand, the concentration is optimized. Further, drawing attention to the balance of coordination capacity of electrolyte solution solvent, supporting salt anion and ligand, they are optimized. On the basis of results of such experiment, it has been known that the stability in high temperature storage can be improved. More specifically, in the lithium secondary battery or lithium polymer battery, a trace of lithium ion selective ligand such as coronand (crown ether) is oriented on the electrode interface. Capacity loss in high temperature storage is mainly considered to be due to self-discharge by side reaction on the positive and negative electrode interface of electrolyte solution solvent. Accordingly, by orienting a lithium ion selective ligand on the electrode interface, an interface state different from the electrode interface formed as an extension of electrolyte solution bulk is formed, and this interface state suppresses the side reaction (oxidation-reduction reaction) of the electrolyte solution solvent.

As the lithium ion selective ligand, multiple types of ligands are specifically described in, for example, Lithium Chemistry (pp. 393–476, ed. by A. Sapse and P. von R. Schleyer, 1995, John Wiley & Sons., Inc., Canada). A preferred ligand has a cyclic structure of coronand (crown ether), podanocoronand (lariat ether), cryptand, and spherand. The crown ether has a cyclic structure, for example, as shown in FIG. 3. No effect was noted in the ligand having podant (grime). The reason is unknown, but it seems because the ligand having a chain structure is unstable, and decomposition or polymerization reaction may occur. The coordination capacity of the ligand to the lithium ion is also related, and if the coordination capacity is too strong, ion conduction in the battery is impeded, and the charging and discharging characteristic is largely lowered. The standard of coordination capacity is unclear, but one of the standards is the size of lithium ion or size of pore of the cyclic ligand. The pore size of the cyclic ligand is estimated from the CPK (Corey-Paulimg-Kortum) model. (See Lithium Chemistry, pp. 406, 410, ed. by A. Sapse and P. von R. Schleyer, 1995, John Wiley & Sons., Inc., Canada.) For example, the pore size of 15-crown-5-ether is 1.7 angstroms, and the pore size of 18-crown-6-ether is 2.86 angstroms. When using 12-crown-4-ether with pore size of 1.55 angstroms claimed to be optimum in Japanese Laid-open Patent No. 6-13110, the discharge capacity was substantially lowered. Therefore, as the ligand of coronand (crown ether) type used in the invention, crown ether having a pore size of 1.7 angstroms or more is preferred, and derivatives of 15-crown-5-ether, benzo-15-crown-5, N-methyl monoazo-15-crown-5, and others, 18-crown-6-ether, its derivatives, 16-crown-5-ether, 21-crown-7-ether, and others may be used. Examples of cryptand are those having a pore size of 1.7 angstroms or more, such as 2,2,1-cryptand, and 2,2,2-cryptand. Further, as the ligand, those having larger cyclic molecules are used, such as podanocoronan (lariat ether) and spherand.

As a result of intensive studies, it is learned that the coordination capacity of electrolyte solution is very important in order to realize the effects of the ligand such as mentioned above. For this purpose, the solvent having the number of donor number of 20 or less is preferred. The number of donor number is defined, in 1,2-dichloroethane, to be the value of molar enthalpy (kcal/mol) in the reaction between the acceptor and the donor by selecting antimony pentachloride of $10^{-3}$ mol.dm$^{-3}$ as the standard acceptor. (See Dictionary of Science, Tokyo Kagaku Dojin, 1989.)

Examples of solvent having a donor number of 20 or less include preferably cyclic carbonates such as ethylene carbonate (16.4 donor number) and propylene carbonate (15.1 donor number), chain carbonates such as diethylene carbonate (15.1 donor number), and aliphatic carboxylic acid esters such as methyl acetate (16.5 donor number) and ethyl acetate (17.1 donor number). In particular, preferred solvents having a donor number of less than 20 are dimethyl carbonate, ethyl methyl carbonate, methyl propionate, and ethyl propionate. In the solvent used in the lithium battery system, solvents having a donor number of 20 or more include, for example, 1,2-dimethoxy ethane (24 donor number), tetrahydro furane (20 donor number), dimethyl sulfoxide (29.8 donor number), and dimethyl formamide (26.6 donor number). The donor numbers are quoted from Lithium Batteries (ed. by G. Pistoia, 1994, Elsevier, Amsterdam), and High-Energy Non-Aqueous Batteries (ed. by A. Cisak and L. Werblan, 1993, Ellis Horwood, England).

A preferred combination of solvents is a combination of cyclic carbonate, such as ethylene carbonate or propylene carbonate, and chain carbonate, such as dimethyl carbonate, diethylene carbonate, or ethyl carbonate. The reason why these solvents are preferred is not known, but it is estimated because the solvation of lithium ion has a coordinated structure of carboxyl group (—OCO$_2$—) in the carbonate system solvent. That is, the cyclic carbonate and chain carbonate have a structure in which a carboxylic group is coordinates in lithium ions, and the lithium ions are stabilized same as in a single solvent of cyclic carbonate, and hence it is more easily stabilized than in a mixed solvent using other chain ester. Further, the mixed solvent system containing chain carbonate has a low boiling point or low viscosity, the effect of enhancing the ion conductivity notably is obtained. It is also possible to mix aliphatic ester carbonate in the solvent as required, usable examples of aliphatic ester carbonate include methyl acetate, ethyl acetate, methyl propionate, and ethyl propionate.

Using such electrolyte solution, the amount of ligand is preferred to be in a range of $10^{-1}$ to $10^{-4}$ in 1 part of supporting salt by the molar ratio to the supporting salt in the electrolyte solution, more preferably in a range of $10^{-2}$ to $10^{-3}$. In the electrolyte solution containing cyclic carbonate and chain-carbonate as solvent (or solvent further mixing an aliphatic carboxylic acid ester), when the content of cyclic carbonate and chain carbonate is more than 80% of total volume of the solvent, the addition of such trace is preferred. When the content of ligand is more than $10^{-1}$ in 1 part of supporting salt by the molar ratio to the supporting salt, adverse effects appear in the discharge characteristic of the battery. The cause is estimated because a complex is formed by ligand in the electrolyte solution using the solvent of the embodiment. When the content of ligand was less than $10^{-4}$ in 1 part of supporting salt by the molar ratio to the supporting salt, such marked effects were not observed.

As the paired anion of supporting salt, an ion of low coordination capacity is preferred. It is known that an anion having a large molecular structure is easily dissociated, but no numerical index such as the number of donor number of the solvent is known. Therefore, from the anions low in coordination capacity listed in "Inorganic Complex, Chelate Complex" (ed. by Japan Society of Chemistry, Experimental Chemistry Lecture 17, 1990, Maruzen, Tokyo), as those applicable to lithium batteries, the following anions are selected: perchlorate ($ClO_4-$), tetrafluoro borate ($BF_4-$), hexafluoro phosphate ($PF_6-$), trifluoromethane sulfonate ($CF_3SO_3-$), and trifluoromethane imide sulfonate ($N(CF_3SO_2-)_2$).

Methods of orienting the ligand such as coronand on the electrode interface include (a) a method of dissolving the coronand in a low boiling point solvent such as diethyl ether, applying the dissolved solution on the electrode surface, and evaporating the low boiling point solvent, (b) a method of evaporating the ligand on the electrode surface in a vacuum chamber, and (c) a method of grinding into powder in the case of ligand high in melting point and low in dissolution, and mixing with active material particles. In a simpler method, the ligand is dissolved and mixed in electrolyte solution, and is oriented on the electrode surface. For example, when the coronand such as 15-crown-5-ether is dissolved in an electrolyte solution of $LiPF_6/(EC+EMC)$ (ratio by weight 1:1), the orientation and adsorption of 15-crown-5-ether on the electrode interface can be confirmed from the peak derived from C-O-C expansion and vibration of 15-crown-5-ether appearing near 1105 $cm^{-1}$ when measuring the double modulation polarization spectrum of Fourier transform infrared spectroscopy (FTIR) (for example, ed. by M. Tasumi, Basic and Practical FTIR, 1994, Tokyo Kagaku Dojin; Electric Chemistry and Industrial Physical Chemistry, 66 (1998), 824).

Embodiments of the invention are described below.

A lithium secondary battery in an embodiment of the invention comprises a positive electrode having a lithium-containing composite oxide as active material, a negative electrode having graphite capable of reacting to insert or extract lithium as active material, an organic electrolyte solution, and a separator. The solvent of the electrolyte solution includes a mixture of cyclic carbonate and chain carbonate. Or the solvent of the electrolyte solution includes a mixture of cyclic carbonate, chain carbonate, and aliphatic carboxylic acid ester. These mixtures are preferred to be contained by more than about 80% of the total solvent volume. A substance containing an anion of low coordination capacity selected from perchlorate ($ClO_4-$), tetrafluoro borate ($BF_4-$), hexafluoro phosphate ($PF_6-$), trifluoromethane sulfonate ($CF_3SO_3-$), and trifluoromethane imide sulfonate ($N(CF_3SO_2-)_2$), and supporting salt are combined to obtain the electrolyte solution. The ligand is added in the battery in a range of $10^{-1}$ to $10^{-4}$ in 1 part of supporting salt by the molar ratio to the supporting salt, and the ligand is oriented on the interface of positive electrode and electrolyte solution layer, and on the interface of the negative electrode and electrolyte solution layer. The ligand has a cyclic structure having a stronger selectivity to lithium ion than solvent or anion, and has a pore size of 1.7 angstroms or more. This composition forms an electrode interface different from the interface of the electrode/electrolyte solution formed as an extension of electrolyte solution bulk, and it suppresses oxidation-reduction reaction occurring as a side reaction of the solvent in the electrolyte solution. As a result, the high temperature storage property of the lithium secondary battery is improved.

A secondary battery in other embodiment of the invention comprises a positive electrode, a negative electrode, a separator, and an organic electrolyte solution. The positive electrode includes an active material mixture layer containing an active material having lithium-containing composite oxide and a first polymer absorbing and holding the organic electrolyte solution, and a current collector for supporting the active material mixture layer. The negative electrode includes an active material mixture layer containing an active material having graphite capable of reacting to insert or extract lithium, and a second polymer absorbing and holding the organic electrolyte solution, and a current collector for supporting the active material mixture layer. The separator has a third polymer for absorbing and holding the organic electrolyte solution, and is porous. The organic electrolyte solution is absorbed and held in the positive electrode, negative electrode, and separator. The solvent of the electrolyte solution includes a mixture of cyclic carbonate and chain carbonate. Or the solvent of the electrolyte solution includes a mixture of cyclic carbonate, chain carbonate, and aliphatic carboxylic acid ester. These mixtures are preferred to be contained by more than about 80% of the total solvent volume. A substance containing an anion of low coordination capacity selected from perchlorate ($ClO_4-$), tetrafluoro borate ($BF_4-$), hexafluoro phosphate ($PF_6-$), trifluoromethane sulfonate ($CF_3SO_3-$), and trifluoromethane imide sulfonate ($N(CF_3SO_2-)_2$), and supporting salt are combined to obtain the electrolyte solution. The ligand is added in the battery in a range of 1 micromole to 1 millimole per 1 Ah of the battery capacity, and the ligand is oriented on the interface of positive electrode and electrolyte solution layer, and on the interface of the negative electrode and electrolyte solution layer. The ligand has a cyclic structure having a stronger selectivity to lithium ion than solvent or anion, and has a pore size of 1.7 angstroms or more. This composition forms an electrode interface different from the interface of the electrode/gel polymer electrolyte formed as an extension of bulk, and it suppresses oxidation-reduction reaction occurring as a side reaction of the plasticizer solvent. As a result, the high temperature storage property of the lithium polymer secondary battery is improved.

Referring now to the drawings, exemplary embodiments of the invention are described below.

Figure 1:
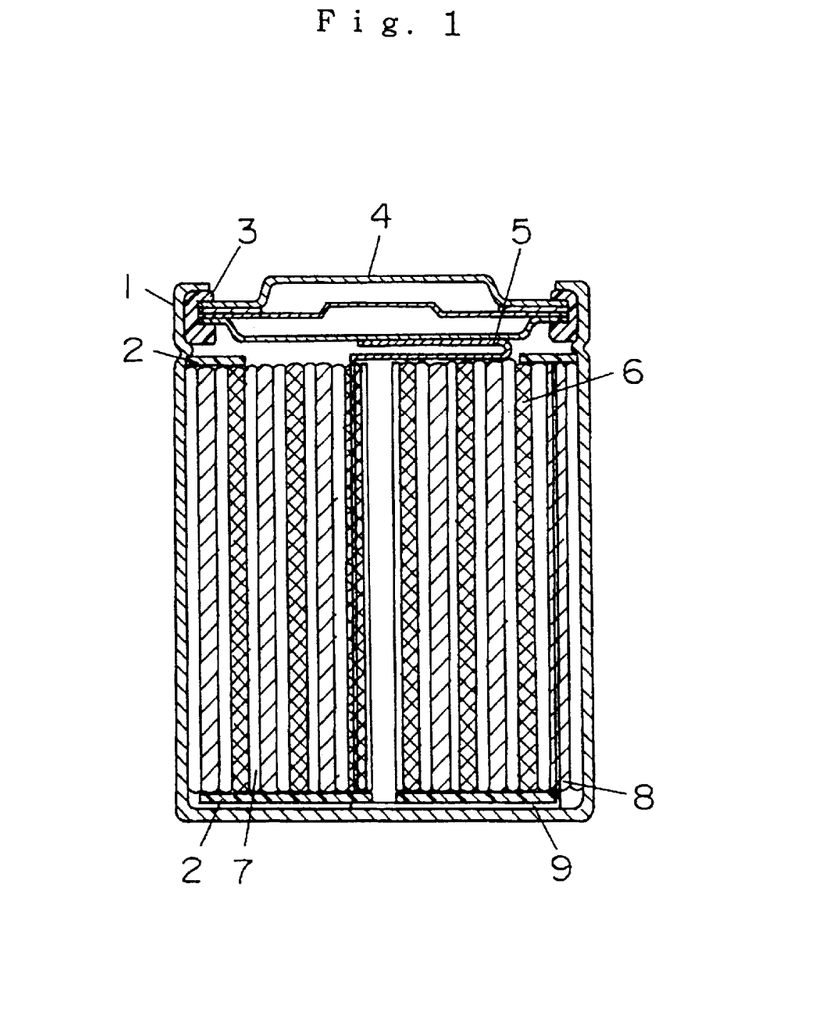
FIG. 1 is a longitudinal sectional view of a cylindrical lithium secondary battery in an embodiment of the invention.

FIG. 1 is a longitudinal sectional view of a cylindrical lithium secondary battery in an embodiment of the invention. A secondary battery comprises a battery case 1, a polyethylene insulating plate 2, a polypropylene gasket 3, a sealing plate 4 with a safety device, an aluminum positive electrode lead 5, a positive electrode plate 6 using lithium-cobalt composite oxide or the like as active material, a polyethylene separator 7, a negative electrode plate 8 using spherical graphite or the like as active material, and a copper negative electrode lead 9. The positive electrode 6 is a positive plate obtained by applying positive electrode paste on an aluminum foil as positive current collector, drying, rolling and cutting to specified size. The positive electrode paste is prepared by mixing and dispersing the active material, conductive agent such as carbon black, and binder such as fluorine resin, in an aqueous solution of carboxymethyl cellulose (CMC). The negative electrode 8 is a negative plate obtained by applying a negative electrode paste on a copper foil as negative current collector, drying, rolling and cutting to specified size. The negative electrode paste is prepared by mixing and dispersing the spherical graphite as active material in an aqueous solution of styrene butadiene rubber (SBR) as binder and CMC. An organic electrolyte solution is contained in the positive electrode 6, separator 7, and negative electrode 8.

Figure 2:
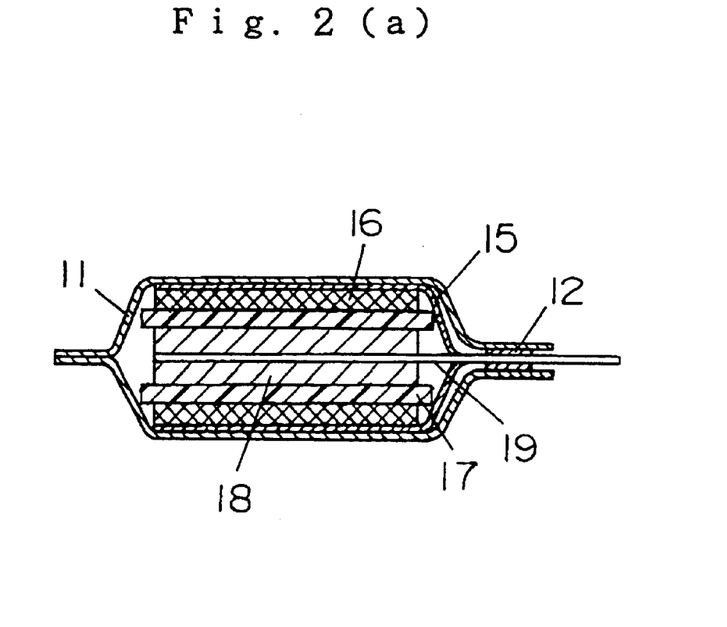
FIG. 2(a) is a longitudinal sectional view of a flat lithium secondary battery in an embodiment of the invention.
FIG. 2(b) is a top view of the same battery.

FIG. 2(a) is a longitudinal sectional view of a flat lithium secondary battery in an embodiment of the invention, and FIG. 2(b) is its top view. A secondary battery comprises an aluminum laminate battery case 11, a lead part fusion seal 12, an aluminum positive electrode lead 15, a positive electrode plate 16 using lithium-cobalt composite oxide or the like as active material, a separator 17 for absorbing and holding an electrolyte solution containing vinylidene fluoride-propylene tetrafluoride copolymer, a negative electrode plate 18 using spherical graphite or the like as active material, and a copper negative electrode lead 19. The positive electrode 16 is a positive plate obtained by applying positive electrode paste on an aluminum foil as positive current collector, drying, and cutting to specified size. The positive electrode paste includes lithium-cobalt composite oxide, carbon black as conductive agent, vinylidene fluoride-propylene tetrafluoride copolymer as a first polymer, N-methyl pyrrolidone as solvent, and dibutyl phthalate as plasticizer. The polymer absorbs and holds the organic electrolyte solution, and has an effect as binder. The negative electrode 18 is a negative plate obtained by applying a negative electrode paste on a copper core as negative current collector, drying, and cutting to specified size. The negative electrode paste includes spherical graphite as active material, vinylidene fluoride-propylene tetrafluoride copolymer as a second polymer, N-methyl pyrrolidone as solvent, and dibutyl phthalate as binder. The polymer absorbs and holds the organic electrolyte solution, and has an effect as binder.

The separator layer 17 is obtained by applying and drying separator paste. The separator paste includes vinylidene fluoride-propylene tetrafluoride copolymer as a third polymer, and silicone oxide fine granules as structural member. The positive electrode plate 16, separator layer 17, and negative electrode plate 18 are fused by heat roller, and dibutyl phthalate is eluted in diethyl ether, and a porous polymer electrode group is obtained. This electrode group is put in the battery case 11, and organic electrolyte solution is poured in, and gel polymer electrolyte is formed. Finally, the aluminum laminate at the opening is heated and fused. Thus, a flat polymer battery is obtained. The secondary battery of the embodiment is shown as cylindrical battery and flat battery, but not limited to these shape, the secondary battery of the invention may be formed in various shapes such as square battery and coin type battery, and the same effects as mentioned above are obtained in such constructions.

In the secondary battery of this exemplary embodiment, the positive electrode defines the capacity, and the discharge capacity is determined by the utility rate of the positive electrode active material.

Specific embodiments of the invention are shown below.

EMBODIMENT 1

Figure 3A:
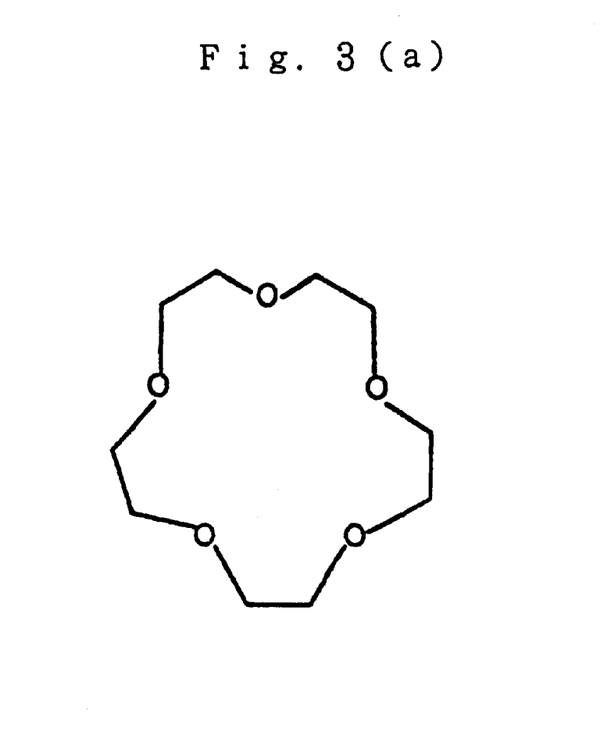
FIG. 3(a) is a chemical structural diagram showing crown ether used in a secondary battery in an embodiment of the invention.
Figure 3B:
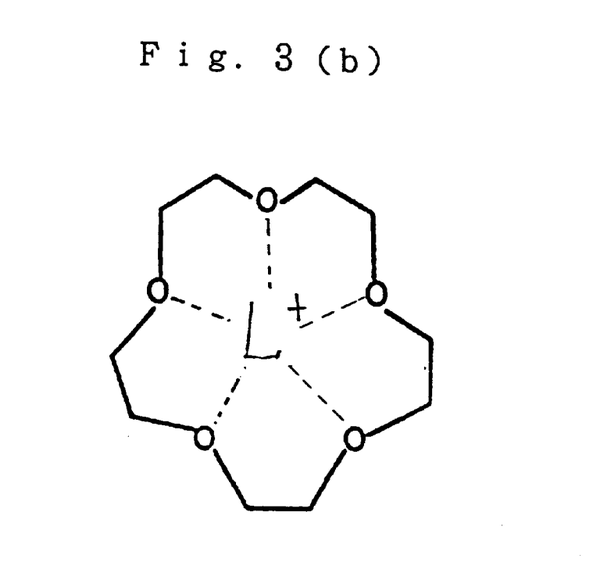
FIG. 3(b) is a chemical structural diagram showing crown ether having Li ion coordinated in a secondary battery in an embodiment of the invention.

A lithium battery in an embodiment of the invention is a cylindrical lithium secondary battery shown in FIG. 1. As the positive electrode active material, lithium-cobalt composite oxide ($LiCoO_2$) was used. As the negative electrode active material, spherical graphite was used. An electrode group having a design discharge capacity of 600 mAh was prepared. In a mixed solvent of ethylene carbonate (EC, 16.4 donor number) and ethyl methyl carbonate (EMC, 20 donor number or less), by dissolving lithium phosphoric acid tetrafluoride ($LiPF_6$) as electrolyte, an electrolyte solution was prepared. The rate of the mixed solvent is EC:EMC=5:5 as the ratio by weight. The electrolyte solution contains the electrolyte at a concentration of 1.0 mole.dm$^{-3}$. In this electrolyte solution, further, 15-crown-5-ether ($C_{10}H_{20}O_5$, pore size 1.7 angstroms, coronand, abbreviated as 15-C-5-E) was added as ligand. The concentration of the ligand in the electrolyte solution is $10^{-2}$ mole dm$^{-3}$. The structural formula of 15-crown-5-ether is shown in FIG. 3. As shown in FIG. 3(a), 15-crown-5-ether has a cyclic structure as chemical structure, and the diameter of the cyclic part is about 1.7 angstroms. As shown in FIG. 3(b), the lithium ion can be coordinates in this cyclic structure.

The design discharge capacity means the capacity calculated at the utility rate of $LiCoO_2$ of 120 mAh/g.

EMBODIMENT 2

As the ligand, 15-crown-5-ether is added in the electrolyte solution at concentration of $10^{-1}$ mole.dm$^{-3}$. The other composition is same as in embodiment 1.

EMBODIMENT 3

As the ligand, 15-crown-5-ether was used. This ligand is added in the electrolyte solution at concentration of $10^{-3}$ mole.dm$^{-3}$. The other composition is same as in embodiment 1.

EMBODIMENT 4

As the positive electrode active material, spinel type lithium-manganese composite oxide ($LiMn_2O_4$) was used. An electrode group having a design discharge capacity of 500 mAh (calculated by supposing the positive electrode utility rate to be 100 mAh/g) was prepared. The design discharge capacity of 500 mAh is the value calculated by supposing the positive electrode utility rate to be 100 mAh/g. As the solvent of the electrolyte solution, a mixed solvent of EC, diethyl carbonate (DEC, 15.1 donor number), and ethyl acetate (EA, 17.1 donor number) was used. The composition of the mixed solvent as the ratio by weight is EC:DEC:EA=4:4:2. The concentration of the positive electrode active material $LiPF_6$ is 1.2 mole.dm$^{-3}$. As the ligand, 18-crown-6-ether ($C_{12}H_{24}O_6$, pore size 2.86 angstroms) was used. This ligand is added in the electrolyte solution at a concentration of $2 \times 10^{-2}$ mole.dm$^{-3}$. The other composition is same as in embodiment 1.

EMBODIMENT 5

As the solvent of the electrolyte solution, a mixed solvent of ethylene carbonate (EC, 16.4 donor number), dimethyl carbonate (DMC, 20 donor number or less), and methyl propionate (MP, 20 donor number or less) was used. The composition of the mixed solvent as the ratio by weight is EC:DMC:MP=4:4:2. As the electrolyte, lithium phosphoric acid tetrafluoride ($LiPF_6$) was used, and the concentration of this electrolyte is 1.5 mole.dm$^{-3}$. As the ligand, cryptand was used, that is, 2,2,1-cryptand ($C_{16}H_{32}N_2O_5$, pore size 1.7 angstroms or more) was used, and the concentration of this ligand is $10^{-2}$ mole.dm$^{-3}$.

EMBODIMENT 6

A lithium battery in other embodiment of the invention is a flat lithium secondary battery as shown in FIG. 2(a) and FIG. 2(b). The positive electrode active material is lithium-cobalt composite oxide. The negative electrode active material is spherical graphite. The separator is vinylidene fluoride-propylene tetrafluoride copolymer. Using these members, an electrode group having a design discharge capacity of 200 mAh was prepared. The design discharge capacity was calculated by supposing the positive electrode utility rate to be 120 mAh/g. In a mixed solvent of ethylene carbonate (EC) and ethyl methyl carbonate (EMC, 20 donor number or less), by dissolving lithium phosphoric acid tetrafluoride ($LiPF_6$) as the electrolyte, an electrolyte solution was prepared. The ratio of composition of the mixed solvent by weight is EC:EMC=5:5. The electrolyte solution contains the electrolyte at a concentration of 1.5 $mol.dm^{-3}$. Further, in the electrolyte solution, 15-crown-5-ether (coronand) was added as ligand. The concentration of the ligand in the electrolyte solution is $5 \times 10^{-3}$ $mol.dm^{-3}$. The electrolyte solution containing this ligand was poured into the electrode group. Thus, the gel polymer electrolyte battery was obtained.

Comparative Example 1

Using the electrolyte solution not containing ligand, a secondary battery of comparative example 1 was prepared. The other composition is same as in embodiment 1.

Comparative Example 2

Using the electrolyte solution by adding 15-crown-5-ether at concentration of $3 \times 10^{-1}$ $mol.dm^{-3}$, a secondary battery of comparative example 2 was prepared. The other composition is same as in embodiment 1.

Comparative Example 3

The electrolyte solution contains a mixed solvent of ethylene carbonate (EC, 16.4 donor number) and dimethoxy ethane (DME, 24 donor number), the composition of the mixed solvent by weight is EC:DME=5:5. The other composition is same as in embodiment 1.

Comparative Example 4

As the ligand, the coronand having a small pore size was used, that is, 12-crown-4-ether. This 12-crown-4-ether has a smaller pore size than the 15-crown-5-ether. The concentration of the ligand is $5 \times 10^{-2}$ $mole.dm^{-3}$ in the electrolyte solution. The other composition is same as in embodiment 1.

Comparative Example 5

The electrolyte solution contains a mixed solvent of ethylene carbonate (EC) and ethyl methyl carbonate (EMC), the composition of the mixed solvent by weight is EC:EMC=5:5. As the ligand, 15-crown-5-ether was used. The concentration of the ligand is $5 \times 10^{-5}$ $mole.dm^{-3}$ in the electrolyte solution. The other composition is same as in embodiment 6. Such gel polymer electrolyte battery was prepared.

Results of Measurement

In the batteries of embodiments 1 to 6 and comparative examples 1 to 5, the discharge capacity before storing in high temperature atmosphere and the discharge capacity after storing in high temperature atmosphere were measured, and the specific capacity after storage at high temperature was comparatively studied. The method of experiment and results of measurement are given below. The batteries were charged and discharged in cycles in the charge and discharge conditions of 20° C. atmosphere, charge end voltage of 4.2 V (4.3 V in the battery of embodiment 4), discharge end voltage of 3.0 V, and 5-hour rate constant current. In the charge and discharge cycle experiment, the charge and discharge capacities of the batteries were measured. The batteries in charged state were stored for 10 days in the high temperature atmosphere of 70° C. After the storage period, the batteries were discharged in the same conditions as before storage in high temperature atmosphere, again, in the atmosphere of 20° C., and the discharge capacity was measured. Thus, the difference in capacity before and after storage in high temperature atmosphere was measured, and the capacity deterioration in high temperature atmosphere was measured. Supposing the discharge capacity before storage in high temperature atmosphere to be 100, the specific capacity after high temperature storage is shown in Table 1a and Table 1b.

TABLE 1a

|  | Embodiment 1 | Embodiment 2 | Embodiment 3 | Embodiment 4 | Embodiment 5 | Embodiment 6 |
| --- | --- | --- | --- | --- | --- | --- |
| Type of electrolyte | $LiPF_6$ | $LiPF_6$ | $LiPF_6$ | $LiPF_6$ | $LiPF_6$ | $LiPF_6$ |
| Concentration of electrolyte ($mol/dm^3$) | 1 | 1 | 1 | 1.2 | 1.5 | 1.5 |
| Type of solvent | EC:EMC | EC:EMC | EC:EMC | EC:DEC:EA | EC:DMC:MP | EC:EMC |
| Mixing ratio (by weight) | 5:5 | 5:5 | 5:5 | 4:4:2 | 4:4:2 | 5:5 |
| Number of donor number of solvent | 20 or less | 20 or less | 20 or less | 20 or less | 20 or less | 20 or less |
| Type of ligand | 15-C-5-E | 15-C-5-E | 15-C-5-E | 18-C-6-E | 2.2.1-cryptand | 15-C-5-E |
| Concentration of ligand ($mol/dm^3$) | $10^{-2}$ | $10^{-1}$ | $10^{-3}$ | $1.67 \times 10^{-2}$ | $6.7 \times 10^{-3}$ | $3.33 \times 10^{-3}$ |
| Pore size of ligand (Å) | 1.7 | 1.7 | 1.7 | 2.86 | 1.7< | 1.7 |
| Concentration of ligand ($\mu m/Ah$) | 46 | 460 | 4.6 | 110 | 46 | 26 |
| Capacity rate after storage in high temperature atmosphere (%) | 86 | 80 | 82 | 84 | 85 | 85 |

TABLE 1b

|  | Comparative example 1 | Comparative example 2 | Comparative example 3 | Comparative example 4 | Comparative example 5 |
|---|---|---|---|---|---|
| Type of electrolyte | $LiPF_6$ | $LiPF_6$ | $LiPF_6$ | $LiPF_6$ | $LiPF_6$ |
| Concentration of electrolyte ($mol/dm^3$) | 1 | 1 | 1 | 1.2 | 1.5 |
| Type of solvent | EC:EMC | EC:EMC | EC:DME | EC:EMC | EC:EMC |
| Mixing ratio (by weight) | 5:5 | 5:5 | 5:5 | 5:5 | 5:5 |
| Number of donor number of solvent | 20 or less | 20 or less | 20< | 20 or less | 20 or less |
| Type of ligand | Not contained | 15-C-5-E | 15-C-5-E | 12-C-4-E | 15-C-5-E |
| Concentration of ligand ($mol/dm^3$) | 0 | $3 \times 10^{-1}$ | $10^{-2}$ | $5 \times 10^{-2}$ | $3.3 \times 10^{-5}$ |
| Concentration of ligand ($\mu m/Ah$) | 0 | 1.380 | 46 | 230 | 0.26 |
| Pore size of ligand (Å) | — | 1.7 | 1.7 | 1.55 | 1.7 |
| Capacity rate after storage in high temperature atmosphere (%) | 73 | 68 | 62 | 70 | 70 |

As clear from the table, in the secondary batteries of embodiment 1 to embodiment 6, the capacity after storage in high temperature atmosphere maintains more than about 80% of the capacity before storage. By contrast, in the secondary batteries of comparative example 1 to comparative example 5, the capacity after storage in high temperature atmosphere is decreased to about less than 80% of the capacity before storage. That is, the secondary batteries of embodiment 1 to embodiment 6, regardless of the type of the active material of the positive electrode, have an excellent maintenance rate of the capacity after high temperature storage. That is, in the secondary batteries of embodiment 1 to embodiment 6, it is understood that side reaction (oxidation-reduction reaction) on the interface of organic solvent and positive and negative electrodes such as ethylene carbonate (EC) and ethyl methyl carbonate (EMC) is suppressed.

However, in the secondary battery containing too much ligand as in comparative example 2, or in the secondary battery using 1,2-dimethoxy ethane copolymer having 24 donor number as in comparative example 3, when stored in high temperature atmosphere, a larger capacity drop was observed than the secondary battery of comparative example 1 not containing ligand. In the secondary battery of comparative example 4 using coronand having a small pore size of 1.55 angstroms (12-crown-4-ether), before storage at high temperature, polarization in discharge was significant, and the actual capacity was lower as compared with the design discharge capacity. This is considered because the 12-crown-4-ether is strongly coordinate in the lithium ion, and the diffusion (move) of lithium ion at the electrode interface is impeded.

As clear from the comparison between embodiment 6 and comparative example 5, the same effects were obtained also in the flat lithium secondary batter adding a polymer having a property of absorbing and holding the electrolyte solution in the positive electrode and negative electrode.

As clear from the description herein, paying attention to the balance of the solvent in the electrolyte solution, supporting salt anion and coordination capacity of ligand, by optimizing them, the stability of positive electrode and negative electrode after storage in high temperature atmosphere can be improved. As a result, the lithium secondary battery of excellent high temperature storage property, excellent reliability, and high energy density is obtained. In particular, these effects are further enhanced when the ligand is added in the battery by a molar ratio in a range of $10^{-1}$ to $10^{-4}$ to the supporting salt, and the ligand is oriented on the interface of the electrode surface and electrolyte solution.

In the embodiments, only $LiPF_6$ is used as the active material, but not limited to this, for example, it is also possible to use lithium perchlorate ($LiClO_4$), lithium tetrafluoro borate ($LiBF_4$), lithium trifluoromethane sulfonate ($LiCF_3SO_3$), and lithium trifluoromethane imide sulfonate ($LiN(CF_3SO_2-)_2$), and same effects are obtained.

INDUSTRIAL APPLICABILITY

In a lithium secondary battery comprising a positive electrode having a lithium-containing composite oxide as active material, a negative electrode having graphite capable of reacting to insert or desorb lithium as active material, and an electrolyte, deterioration of battery characteristic after storage of secondary battery in high temperature atmosphere is notably improved, and even after storage in high temperature atmosphere, the lithium secondary battery maintaining high reliability and high energy density is obtained.

What is claimed is:

1. A lithium secondary battery comprising:
   a positive electrode comprising a lithium containing oxide as a positive electrode active material,
   a negative electrode comprising graphite capable of reacting to insert and extract lithium ions as a negative electrode active material,
   an electrolyte solution,
   a separator, and
   a ligand selected from the group consisting of coronands, podanocoronands, cryptands, spherands, and mixtures thereof,
   wherein:
   said electrolyte solution comprises a solvent and an electrolyte dissolved in said solvent,
   said solvent has about a donor number of 20 or less,
   said ligand is oriented at an interface of said electrolyte solution and a surface of the positive electrode and at an interface of said electrolyte solution and a surface of the negative electrode, said ligand has a stronger coordination selecting capacity than said solvent or said electrolyte for lithium ions, said ligand has a cyclic structure having a pore, said pore has a diameter of about 1.7 angstroms or more, and the concentration of said ligand in said battery is either
(i) in a range of $1.67 \times 10^{-2}$ to $10^{-4}$ by molar ratio to said electrolyte, or
(ii) in a range of 110 micromole to 1 millimole per 1 Ah of the capacity of said battery.

2. The lithium secondary battery of claim 1, wherein:
said electrolyte solution comprises said ligand, and
the concentration of said ligand is in a range of $1.67 \times 10^{-2}$ to $10^{-4}$ by molar ratio to said electrolyte.

3. The lithium secondary battery of claim 1, wherein:
said electrolyte solution comprises said ligand, and
the concentration of said ligand is in a range of 110 micromole to 1 millimole per 1 Ah of the capacity of said battery.

4. The lithium secondary battery of claim 1, wherein said solvent comprises a mixed solvent of either:
(a) a cyclic carbonate and a chain carbonate, or
(b) a cyclic carbonate, a chain carbonate, and an aliphatic carboxylic acid ester.

5. The lithium secondary battery of claim 4, wherein said mixed solvent comprises more than 80% of the total volume of said solvent.

6. The lithium secondary battery of claim 1, wherein said electrolyte comprises at least one anion selected from the group consisting of perchlorate, tetrafluoro borate, hexafluoro phosphate, trifluoromethane sulfonate, and trifluoromethane imide sulfonate.

7. The lithium secondary battery of claim 1, wherein said ligand is at least one ligand selected from the group consisting of coronands and cryptands.

8. The lithium secondary battery of claim 1, wherein said lithium containing oxide comprises lithium cobalt oxide.

9. The lithium secondary battery of claim 1, wherein:
said positive electrode comprises a positive current collector and a positive electrode active material mixture layer supported on said positive current collector, said positive electrode active material mixture layer comprises said positive electrode active material, and a first polymer absorbing and holding said electrolyte solution, said negative electrode comprises a negative current collector and a negative electrode active material mixture layer supported on said negative current collector, said negative electrode active material mixture layer comprises said negative electrode active material, and a second polymer absorbing and holding said electrolyte solution, said separator has a third polymer absorbing and holding said electrolyte solution, and the concentration of said ligand is in a range of 110 micromole to 1 millimole per 1 Ah of the battery capacity.

10. The lithium secondary battery of claim 1, wherein said ligand is selected from the group consisting of 15-crown-5-ether, 18-crown-6-ether, and 2,2,1-cryptand.

11. A lithium secondary battery comprising:
a positive electrode comprising a lithium-containing composite oxide as a positive electrode active material, a negative electrode comprising graphite capable of reacting to insert and extract lithium ions as a negative electrode active material, an electrolyte solution comprising an organic solvent and a supporting salt dissolved in said organic solvent, a separator disposed between said positive electrode and negative electrode, and a ligand selected from the group consisting of coronands, podanocoronands, cryptands, spherands, and mixtures thereof, wherein:
said organic solvent comprises a mixed solvent of either (a) a cyclic carbonate and a chain carbonate, or (b) a cyclic carbonate, a chain carbonate, and an aliphatic carboxylic acid ester, said mixed solvent comprises more than 80% of the total volume of said organic solvent, said supporting salt comprises a substance comprising at least one anion selected from the group consisting of perchlorate, tetrafluoro borate, hexafluoro phosphate, trifluoromethane sulfonate, and trifluoromethane imide sulfonate, said ligand has a stronger coordination selecting capacity than said organic solvent or said anion for lithium ions, said ligand has a cyclic structure having a pore, said pore has a diameter of about 1.7 angstroms or more, the concentration of said ligand in the battery is in a range of $1.67 \times 10^{-2}$ to $10^{-4}$ by molar ratio in 1 part of supporting salt by molar ratio to said supporting salt, and said ligand is oriented at the interface of said positive electrode and said electrolyte solution, and at the interface of said negative electrode and said electrolyte solution.

12. The lithium secondary battery of claim 11, wherein said ligand is at least one ligand selected from the group consisting of coronands and cryptands.

13. The lithium secondary battery of claim 11, wherein said ligand is selected from the group consisting of 15-crown-5-ether, 18-crown-6-ether, and 2,2,1-cryptand.

14. A lithium secondary battery comprising:
(a) an organic electrolyte solution comprising an organic solvent and a supporting salt dissolved in said organic solvent, (b) a positive electrode comprising
an active material mixture layer comprising an active material comprising a lithium-containing composite oxide and a first polymer absorbing and holding said organic electrolyte solution, and a positive current collector supporting said active material mixture layer, (c) a negative electrode comprising
an active material mixture layer comprising an active material comprising graphite capable of reacting to insert or extract lithium ions, and a second polymer absorbing and holding said organic electrolyte solution, and
a negative current collector supporting said active material mixture layer,
(d) a porous separator having a third polymer for absorbing and holding said organic electrolyte solution, and
(e) a ligand selected from the group consisting of coronands, podanocoronands, cryptands, spherands, and mixtures thereof, wherein:
said organic solvent comprises a mixed solvent of either (1) a cyclic carbonate and a chain carbonate, or (2) a cyclic carbonate, a chain carbonate, and an aliphatic carboxylic acid ester,
said mixed solvent comprises more than 80% of the total volume of said organic solvent,
said supporting salt comprises a substance comprising at least one anion selected from the group consisting of perchlorate, tetrafluoro borate, hexafluoro phosphate, trifluoromethane sulfonate, and trifluoromethane imide sulfonate,
said ligand has a stronger coordination selecting capacity than said organic solvent or said anion for lithium ions,
said ligand has a cyclic structure having a pore,
said pore has a diameter of about 1.7 angstroms or more,
the concentration of said ligand in the battery is in a range of 110 micromole to 1 millimole per 1 Ah the capacity of said battery, and
said ligand is oriented at the interface of said positive electrode and said electrolyte solution, and at the interface of said negative electrode and said electrolyte solution.

15. The lithium secondary battery of claim 14, wherein said ligand is at least one ligand selected from the group consisting of coronands and cryptands.

16. The lithium secondary battery of claim 14, wherein said ligand is selected from the group consisting of 15-crown-5-ether, 18-crown-6-ether, and 2,2,1-cryptand.

* * * * *